United States Patent [19]

Vermeiren et al.

[11] Patent Number: 5,675,049
[45] Date of Patent: Oct. 7, 1997

[54] PROCESS FOR PRODUCING LIQUID ETHYLENE-TYPE RANDOM COPOLYMERS

[76] Inventors: Walter Vermeiren, Helzoldstraat 8R1, B-3530 Helchteren, Belgium; Patrick Brems, Mozartstr. 10, D-67545 Worms, Germany; Herve Hinnekens, Kortrijksesteenweg 999, B-9000 Gent, Belgium

[21] Appl. No.: 115,292

[22] Filed: Aug. 31, 1993

[30] Foreign Application Priority Data

Aug. 31, 1992 [EP] European Pat. Off. .............. 92870135

[51] Int. Cl.$^6$ .................. C07C 2/22; C07C 2/26; C07C 2/34
[52] U.S. Cl. .................. 585/511; 585/512; 585/520; 585/523; 585/524
[58] Field of Search .................. 585/502, 511, 585/512, 520, 523, 524

[56] References Cited

U.S. PATENT DOCUMENTS

| | | | |
|---|---|---|---|
| 4,704,491 | 11/1987 | Tsutsui et al. | 585/10 |
| 4,794,096 | 12/1988 | Ewen | 502/117 |
| 4,814,540 | 3/1989 | Watanabe et al. | 585/523 |
| 4,892,851 | 1/1990 | Ewen et al. | 502/104 |
| 4,962,248 | 10/1990 | Winter et al. | 585/12 |
| 4,962,262 | 10/1990 | Winter et al. | 585/12 |
| 4,975,403 | 12/1990 | Ewen | 502/113 |
| 5,155,080 | 10/1992 | Ewen et al. | 502/152 |
| 5,171,919 | 12/1992 | Watanabe et al. | 585/523 |

OTHER PUBLICATIONS

Chien et al.: J. Polymer. Sci., vol. 29, pp. 1603–1607, 1991.

*Primary Examiner*—Ponnathapura Achutamurthy
*Attorney, Agent, or Firm*—William D. Jackson; Jim D. Wheelington; M. Norwood Cheairs

[57] ABSTRACT

A process is provided for producing liquid ethylene-type random copolymers by copolymerizing ethylene and a $C_3$—$C_{20}$ alpha-olefin in the presence of a catalyst comprising an alumoxane and a stereorigid metallocene compound described by the formula:

$$R''(CpR_5)(CpR'_5)MeQ_2$$

wherein each Cp is a cyclopentadienyl or substituted cyclopentadienyl ring; each R and R' is the same or different and is hydrogen or a hydrocarbyl radical having 1–20 carbon atoms or two R or two R' together form a hydrocarbyl radical having 2–20 carbon atoms; R'' is a structural bridge between the two Cp rings imparting stereorigidity to the compound; Me is a transition metal of Group IVb of the periodic table; and each Q is a hydrocarbyl radical having 1–20 carbon atoms or is a halogen. A portion of the alumoxane may be replaced with an alkylaluminum.

6 Claims, No Drawings

PROCESS FOR PRODUCING LIQUID ETHYLENE-TYPE RANDOM COPOLYMERS

TECHNICAL FIELD OF THE INVENTION

This invention relates to a process for producing liquid ethylene-type random copolymers. Such copolymers are characterized by narrow molecular weight and composition distributions and are suitable for use as a lubricant oil. The term "liquid ethylene-type random copolymer", as used herein, also denotes a waxy ethylene-type random copolymer.

BACKGROUND OF THE INVENTION

The use of liquid ethylene/alpha-olefin copolymers, typically liquid ethylene/propylene copolymer, in applications such as synthetic lubricant oils or various resin modifiers is known in the art. Such copolymers are typically copolymerizing ethylene with alpha-olefins in the presence of titanium-type catalysts (composed of titanium compounds and organoaluminium compounds) or vanadium-type catalysts (composed of vanadium compounds and organoaluminium compounds). Liquid ethylene/alpha-olefin copolymers produced in the presence of the titanium-type catalysts generally have poor randomness, broad molecular weight and composition distributions, and poor properties for use as synthetic lubricant oils. Liquid ethylene/alpha-olefin copolymers produced in the presence of the vanadium-type catalysts possess somewhat improved properties for use as synthetic lubricant oils, such as higher randomness and more narrow molecular weight and composition distributions as compared to the copolymers obtained with the titanium-type catalysts. It is still desired however to improve the quality of such copolymers for applications having more rigorous requirements.

A series of prior art publications disclose catalysts containing zirconium compounds and aluminoxanes as new Ziegler-type olefin polymerization catalysts. These publications, however, fail to disclose or suggest the use of such catalysts for the production of liquid ethylene/alpha-olefin copolymers.

European Patent EP-200351-B discloses (i) liquid ethylene-type random copolymers which consist essentially of units derived from ethylene and an alpha-olefin having 3 to 20 carbon atoms, and which have a number of characteristics, (ii) a process for producing said copolymers which comprises copolymerizing ethylene and said alpha-olefin in the presence of a catalyst comprising a compound of a transition metal of Group IVb of the periodic table and an alumoxane, and (iii) use of said copolymers or of the hydrogenation product thereof as a synthetic lubricating oil.

SUMMARY OF THE INVENTION

The Applicant has now found a new process for producing liquid ethylene-type random copolymers made up predominately of units derived from ethylene and an alpha-olefin having 3 to 20 carbon atoms. In accordance with the present process, less alumoxane is required to yield products particularly suitable for use as synthetic lubricating oil.

DETAILED DESCRIPTION OF THE INVENTION

More specifically, the process of the present invention is directed to the production of liquid ethylene-type random copolymers by copolymerizing ethylene and an alpha-olefin having 3 to 20 carbon atoms in the presence of a catalyst comprising a compound of a transition metal of Group IVb of the periodic table and an alumoxane. The present process employs a stereorigid metallocene compound described by the formula:

$$(CpR_4)R''(CpR'_4)MeQ_2$$

wherein each Cp is a cyclopentadienyl or substituted cyclopentadienyl ring; each R and R' is the same of different and is hydrogen or hydrocarbyl radical having 1–20 carbon atoms or two R or two R' together from a hydrocarbyl radical having 2–20 carbon atoms; R'' is a structural bridge between the two Cp rings imparting stereorigidity to the compound; Me is a transition metal of Group IVb of the periodic table; and each Q is a hydrocarbyl radical having 1–20 carbon atoms or is a halogen. Further, a portion of the alumoxane employed in the present process can be replaced with an alkylaluminum.

Methods for preparing such stereorigid metallocene compounds are well known in the art. Me is preferably zirconium, and Q is preferably chlorine. Exemplary hydrocarbyl radicals include alkyl radicals such as isopropyl, butyl, isobutyl, amyl, isoamyl, hexyl, heptyl, octyl, nonyl, decyl, cetyl, and the like. Other hydrocarbyl radicals include aryl, alkenyl, alkylaryl or arylalkyl radicals. Further, R and R' may be radicals that are bonded to two carbon atoms in the ring. R'' is preferably selected from the group consisting of alkylene radicals having 1–4 carbon atoms and their substituted analogues. Particularly preferred catalysts include isopropyl (fluorenyl) (cyclopentadienyl) Zr dichloride, and its counterpart with an ethyl bridge.

The transition metal compound may be used directly. Preferably, when transition metal compounds which are difficulty soluble in solvents such as toluene (for example, bis(cyclopentadienyl)zirconium monochloride monohydride) are used, they are first contacted with organoaluminium compounds. This operation renders the sparingly solvent-soluble transition metal compounds readily soluble in solvents, as known in the art.

Preferred examples of the alumoxane employed in the present invention are described by the formula:

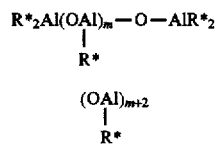

wherein R* is an alkyl group such as methyl, ethyl, propyl or butyl, preferably methyl or ethyl and most preferably methyl; m is preferably more than 20, more preferably at least 25, and most preferably 30 to 100. Methods for preparing such aluminoxanes are well known in the art.

Suitable alkylaluminums are well known in the art and need not be described here. Particularly preferred alkylaluminum compounds include trialkylaluminums wherein the alkyl group is ethyl or isobutyl.

In the process of this invention, an initial feedstream comprising a mixture of ethylene and an alpha-olefin having 3 to 20 carbon atoms is fed to a polymerization reaction system. The ethylene content of the initial feedstream is usually 2 to 80 mole %, preferably 4 to 55 mole %, and the alpha-olefin content is usually 20 to 98 mole %, preferably 45 to 96 mole %.

Specific examples of suitable alpha-olefins contained in the initial feedstream to be employed in the process of the present invention are propylene, 1-butene, 1-hexene, 4-methyl-1-pentene, 1-octene, 1-decene, 1-dodecene, 1-tetradecene, 1-hexadecene, 1-octadecene and 1-eicocene.

The polymerization reaction of the olefins in accordance with the process of this invention is usually carried out in a hydrocarbon solvent. Examples of the hydrocarbon solvent suitable for this purpose are aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and light oils. Additionally, the olefins contained in the initial feedstream may themselves serve as the hydrocarbon medium. Among these hydrocarbon media, the aromatic hydrocarbons and the olefins in the initial feedstream are preferred.

Preferred polymerization temperatures employed in the present process are between about −50° to 200° C., more preferably −30° to 100° C., with −20° to 80° C.

The proportion of the transition metal compound (A) used in practicing the process of this invention is, for example, $10^{-8}$ to $10^{-2}$ gram-atom/liter, preferably $10^{-7}$ to $10^{-2}$ gram-atom/liter, as the concentration of the transition metal in the polymerization reaction system. The proportion of the aluminoxane (B) used is, for example, $10^{-4}$ to $10^{-2}$ gram-atom/liter, preferably $10^{-7}$ to $10^{-3}$ gram-atom/liter, as the concentration of the transition metal in the polymerization reaction system. The molar ratio of the aluminum atom to the transition metal in the polymerization reaction system is, for example, in the range of 25 to $10^7$, preferably 50 to 500 and most preferably 75 to 125; it is indeed a characteristic of the process of this invention that less alumoxane is required. Also, up to 90% of the aluminum can be in the form of alkylaluminum. This is unexpected since olefin polymerization was long thought impossible therewith at significant levels. The molecular weight of the copolymer can be controlled by using hydrogen, and/or by adjusting the polymerization temperature.

When the copolymerization reaction in the process of this invention is carried out in the absence of hydrogen, a liquid ethylene-type random copolymer having a high iodine value can be obtained. When the present process is carried out in the presence of hydrogen, a liquid ethylene-type random copolymer having a low iodine value or an iodine value of substantially zero can be obtained.

The polymerization reaction mixture prepared in accordance with the present process is worked up in a customary manner to give the liquid ethylene-type random copolymer of the invention. When a liquid ethylene-type random copolymer having a high iodine value obtained by the present process is hydrogenated in the presence of a hydrogenating catalyst, a liquid ethylene-type random copolymer having a lower iodine value or an iodine value of substantially zero can be obtained. Examples of suitable hydrogenating catalysts are metals of Group VIII of the periodic table such as iron, cobalt, nickel, rhodium, palladium and platinum. Of these, nickel is preferred. Raney nickel is especially preferred. The hydrogenation reaction may be carried out in the presence or absence of solvent. Examples of the solvent are hydrocarbons such as pentane, hexane, heptane, octane, decane, cyclohexane, methylcyclohexane and cyclooctane. The temperature in the hydrogenation reaction is, for example, 50° to 250° C., preferably 100° to 200° C. The hydrogenation reaction pressure is, for example, in the range of 0.5 to 9.8 MPa-G.

The liquid ethylene-type random copolymers of this invention have an ethylene unit content of 10 to 85 mole %, preferably 20 to 80 mole %, and most preferably 30 to 70 mole %, and an alpha-olefin unit content of 15 to 90 mole %, preferably 20 to 80 mole %, and most preferably 30 to 70 mole %.

For use as a lubricant oil, the liquid ethylene-type random copolymers should have an iodine value of 0 to 0.3 preferably 0 to 0.2, and most preferably 0 to 0.1. The liquid ethylene-type random copolymers prepared by the process of this invention possess various excellent properties required of lubricant oils.

When liquid ethylene-type random copolymer prepared by the process of the present invention are hydrogenated, hydrogenated polymers having a high viscosity index, a high ignition point, a low pour point, excellent shear stability, excellent oxidation stability, excellent thermal stability and high oil film strength are obtained. The hydrogenated polymers possess superior properties which are considered necessary to lubricating oils, and may thus be used as a synthetic lubricant.

The following examples specifically illustrate the present invention, but are not intended to limit the scope thereof.

EXAMPLE 1

A 2 liter continuous polymerization reactor was charged with 300 ml of cyclohexane, 13.1 mmol of methylaluminoxane and 0.036 mmol of ethylene bis(indenyl) zirconium dichloride. Ethylene and propylene were simultaneously fed continuously into the reactor at a rate of 700 ml/min and 1400 ml/min, respectively, and polymerized at 60° C. and 5.8 bar pressure with a residence time of 61 min under such conditions as to provide 100 g of polymer.

The resulting polymer solution was continuously withdrawn for the reactor, and the polymerization was stopped by adding a small amount of methanol. The polymer solution was washed four times with a large amount of water. Subsequent removal of toluene from the polymer solution gave a liquid polymer.

EXAMPLES 2–6 AND COMPARATIVE EXAMPLES A–B

Example 1 was repeated except that the conditions indicated in the Table, below, were employed.

The metallocene used was the same except in examples 2 and comparative examples A and B wherein isopropyl (cyclopentadienyl) (fluorenyl) zirconium dichloride, bis (indenyl) zirconium dichloride and bis (cyclopentadienyl) zirconium dichloride were used respectively.

Methylalumoxane (MAO) was used in all examples, except in example 6 and comparative examples A and B wherein 1.3 mmol MAO and 11.8 mmol (triisobutylaluminum) TIBA, were used and in examples 12 and 13 wherein 13.1 mmol ethylalumoxane (EAO) were used.

In examples 4, 5, 11 and 13, hydrogen was used at a rate of 400, 200, 100 and 200 ml/min respectively.

In examples 5, 8 to 14 and comparative example C, toluene was used instead of cyclohexane.

The yield and appearance of the polymer produced are also indicated in the table.

| Example | Exp. No. | Solvent ml | Zr mmol | MAO mmol | TIBA mmol | C₂ ml/mi | C₃ ml/min | H₂ ml/min | T °C. | Time min | Yield g | Appearance |
|---|---|---|---|---|---|---|---|---|---|---|---|---|
| 1 | Lub389 | 300 | 0.036 | 13.1 | 0 | 700 | 1400 | 0 | 60 | 61 | 100.0 | Waxy |
| 2 | Lub388 | 300 | 0.036 | 13.1 | 0 | 700 | 1400 | 0 | 60 | 55 | 75.0 | Waxy |
| 3 | Lub425 | 300 | 0.036 | 13.1 | 0 | 700 | 1400 | 0 | 100 | 75 | 103.0 | Very viscous |
| 4 | Lub456 | 150 | 0.018 | 6.6 | 0 | 700 | 1400 | 400 | 90 | 75 | 200.0 | Liquid |
| 5 | Lub433 | 300 | 0.036 | 13.1 | 0 | 700 | 1400 | 200 | 120 | 75 | 121.0 | Liquid |
| 6 | Lub390 | 300 | 0.036 | 1.3 | 11.8 | 700 | 1400 | 0 | 60 | 75 | 94.3 | Very viscous |
| 7 | Lub427 | 300 | 0.036 | 9.0 | 0 | 700 | 1400 | 0 | 100 | 75 | 115.6 | Very viscous |
| 8 | FIE49 | 150 | 0.018 | 4.5 | 0 | 700 | 1400 | 0 | 120 | 60 | 51.6 | Very viscous |
| 9 | FIE82 | 300 | 0.072 | 5.4 | 0 | 700 | 1400 | 0 | 100 | 53 | 197.6 | Waxy |
| 10 | FIE85 | 300 | 0.072 | 3.6 | 0 | 700 | 1400 | 0 | 100 | 75 | 147.4 | Waxy |
| 11 | Lub468 | 150 | 0.036 | 2.7 | 0 | 700 | 1400 | 100 | 90 | 75 | 158.0 | Very viscous |
| 12 | FIE57 | 300 | 0.036 | EAO = 13.1 | | 700 | 1400 | 0 | 60 | 75 | 111.6 | Waxy |
| 13 | Lub443 | 300 | 0.036 | EAO = 13.1 | | 700 | 1400 | 200 | 60 | 75 | 72.0 | Waxy |
| 14 | FIE48 | 300 | 0.030 | 10.9 | 0 | 960 | 1920 | 0 | 120 | 40 | 102.5 | Very viscous |
| A | Lub395 | 300 | 0.036 | 1.3 | 11.8 | 700 | 1400 | 0 | 60 | 75 | 37.5 | Polymer |
| B | FIE27 | 300 | 0.036 | 1.3 | 11.8 | 700 | 1400 | 0 | 60 | 75 | 0.0 | |
| C | FIE84 | 300 | 0.072 | 2.7 | 0 | 700 | 1400 | 0 | 100 | 75 | 7.4 | Waxy |

These examples indicate that types of alkylaluminums can be used other than MAO at constant Al/Zr ratio. They also show that increasing the reaction temperature decreases the molecular weight of the oligomers without affecting the catalyst activity too significantly. They further illustrate that hydrogen has a very positive effect on catalyst activity and stability (e.g. the yield in example 4 is of about $10^5$ g/g Zr.h and 900 g/g Al.h, and in example 11 of 1734 g/g Al.h); whilst not wishing to be bound by a theory, it would seem that this is due to an increased stability of the catalyst in the presence of hydrogen.

We claim:

1. A process for producing liquid random copolymers comprising copolymerizing ethylene and an alpha-olefin having 3 to 20 carbon atoms in the presence of a catalyst comprising a hydrocarbon solvent soluble stereorigid metallocene compound effective in copolymerizing said ethylene and alpha olefin to produce a liquid random copolymer described by the formula:

(CpR₄)R"(CpR'₄)MeQ₂ 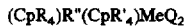

wherein each (CpR₄) and (CpR'₄) is a cyclopentadienyl or substituted cyclopentadienyl ring; each R and R' is the same or different and is hydrogen or a hydrocarbyl radical having 1–20 carbon atoms or two R or two R' together form a hydrocarbyl radical having 2–20 carbon atoms; R" is a structural bridge between (CpR₄) and (CpR'₄) imparting stereorigidity to the compound; Me is a transition metal of Group IVb of the periodic table; and each Q is a hydrocarbyl radical having 1–20 carbon atoms or is a halogen and a mixture of alumoxane and an alkyl aluminum in an amount to provide a molar ratio of aluminum to transitional metal between about 50 and 500 and wherein up to 90 mole % of the aluminum present in said mixture is in the alkyl aluminum to produce liquid random copolymer which is liquid at ambient temperature conditions.

2. The process according to claim 1, wherein the molar ratio of aluminum to transition metal is between about 75 and 125.

3. The process of claim 1 wherein said stereorigid metallocene is an isopropylfluorenylcyclopentadienyl zirconium dichloride or an ethylenefluorenylcyclopentadienyl zirconium dichloride.

4. The process of claim 3 wherein the mole ratio of aluminum to zirconium is within the range of 75–125.

5. The process of claim 1 wherein said alkylaluminum selected from the group consisting of triethylaluminum and triisobutylaluminum.

6. The process of claim 5 wherein the mole ratio of alkylaluminum to alumoxane is about 9.

* * * * *